(12) United States Patent
Spofford et al.

(10) Patent No.: US 10,437,583 B2
(45) Date of Patent: Oct. 8, 2019

(54) SYSTEMS AND METHODS FOR STRATEGIC MAINTENANCE OF A PRODUCTION ENVIRONMENT UTILIZING A BUSINESS RULES MANAGEMENT SYSTEM

(71) Applicant: The Travelers Indemnity Company, Hartford, CT (US)

(72) Inventors: Rose Weiner Spofford, Chester Springs, PA (US); Lisa N. Dill, Monson, MA (US); Syam S. Murikipudi, Elkridge, MD (US); Frederick W. Dahlke, Jarrettsville, MD (US); Susan E. Roberts, Bolton, CT (US)

(73) Assignee: The Travelers Indemnity Company, Hartford, CT (US)

( * ) Notice: Subject to any disclaimer, the term of this patent is extended or adjusted under 35 U.S.C. 154(b) by 307 days.

(21) Appl. No.: 15/624,684

(22) Filed: Jun. 15, 2017

(65) Prior Publication Data
US 2018/0365612 A1    Dec. 20, 2018

(51) Int. Cl.
| G06F 8/70 | (2018.01) |
| G06Q 10/06 | (2012.01) |
| G06Q 10/00 | (2012.01) |
| G06F 8/65 | (2018.01) |

(52) U.S. Cl.
CPC ............... G06F 8/70 (2013.01); G06F 8/65 (2013.01); G06Q 10/0637 (2013.01); G06Q 10/20 (2013.01)

(58) Field of Classification Search
CPC ......... G06F 8/65; G06F 8/70; G06Q 10/0637; G06Q 10/20

USPC ........................ 717/120–123; 705/7.11, 7.36
See application file for complete search history.

(56) References Cited

U.S. PATENT DOCUMENTS

| 2003/0182652 A1* | 9/2003 | Custodio | G06F 8/61 |
| | | | 717/122 |
| 2005/0015762 A1* | 1/2005 | Steckler | G06F 8/71 |
| | | | 717/176 |
| 2005/0044531 A1* | 2/2005 | Chawla | G06F 8/71 |
| | | | 717/122 |
| 2009/0288078 A1* | 11/2009 | Makonahalli | G06F 8/60 |
| | | | 717/174 |
| 2010/0125840 A1* | 5/2010 | Schneider | G06F 8/71 |
| | | | 717/172 |
| 2011/0219355 A1* | 9/2011 | Matsumoto | G06F 9/44 |
| | | | 717/106 |
| 2012/0180024 A1* | 7/2012 | Gonzalez | G06F 8/71 |
| | | | 717/109 |
| 2014/0189641 A1* | 7/2014 | Anderson | G06F 8/60 |
| | | | 717/110 |
| 2015/0149979 A1* | 5/2015 | Talby | G06F 8/35 |
| | | | 717/104 |
| 2016/0378449 A1* | 12/2016 | Khazanchi | G06F 8/71 |
| | | | 717/120 |
| 2017/0003948 A1* | 1/2017 | Iyer | G06F 8/65 |

* cited by examiner

*Primary Examiner* — Qing Chen
(74) *Attorney, Agent, or Firm* — Fincham Downs LLC; Carson C. K. Fincham

(57) ABSTRACT

Systems, methods, and articles of manufacture provide for strategic maintenance of a production environment utilizing a Business Rules Management System (BRMS) topology by selectively executing batch files and transformation scripts to edit production tables in a staging environment and test the edited tables in an emergency fix environment utilizing an edited date override table.

4 Claims, 9 Drawing Sheets

SYSTEMS AND METHODS FOR STRATEGIC MAINTENANCE OF A PRODUCTION ENVIRONMENT UTILIZING A BUSINESS RULES MANAGEMENT SYSTEM

BACKGROUND

The development, management, testing, and rollout of computer code, applications, and services to production environments has become a complex, well-structured, and time-consuming task for businesses in many industries. Businesses that conduct online transactions with consumers, for example, must implement appropriate protocols, procedures, and often distinct hardware topographies to ensure that consumer-facing production environment services and applications are maintained in proper working order. These safeguards, however, may conflict with business goals for timely deployment of production environment changes. In industries where regulatory approval of production changes is required (e.g., banking, gambling, insurance) the tension between speedy rollout and production environment protection can be significant.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
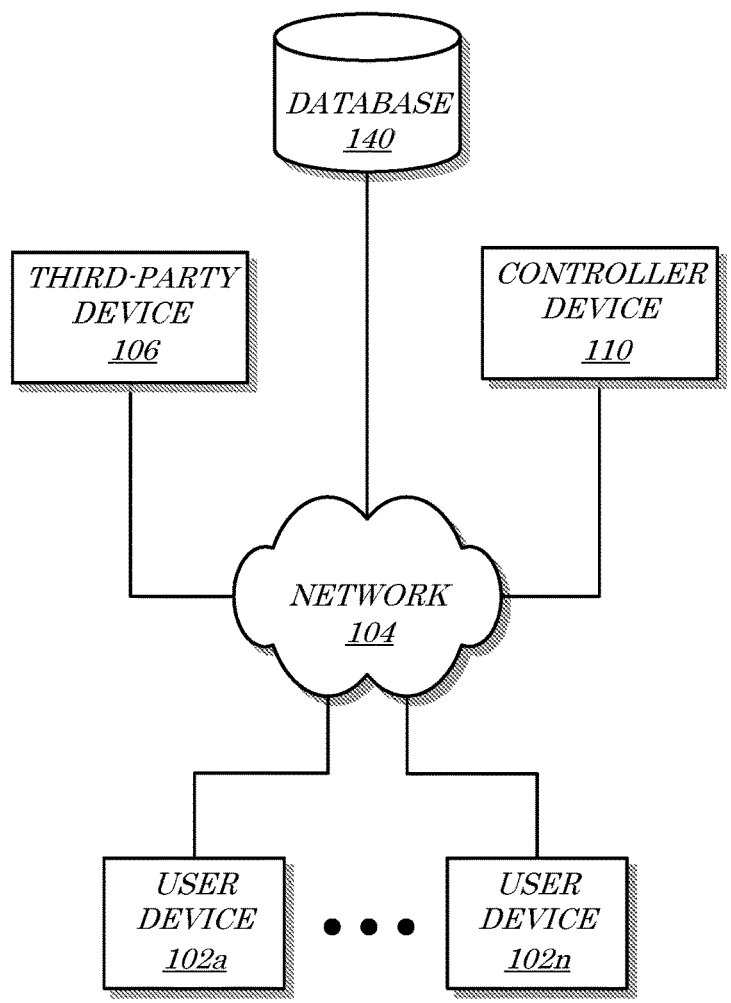
FIG. 1 is a block diagram of a system according to some embodiments.

The ability to streamline or accelerate code, application, and/or services rollouts to a production environment has been hampered by rollout system structures and procedures implemented to protect the production environment. Complex logic, rules, formulas, and/or other code or application instructions utilized in various industries must typically, for example, go through a series of testing, debugging, modeling, and/or other rollout steps or processes to ensure that the industry's production environment maintains operational stability. The type, number, and complexity of such processes vary between industrial entities, but, once established, typically define a rollout process that is standardized and not easily circumvented (by design). Many modern companies utilize a specialized Business Rules Management System (BRMS) or other organizational and/or structural topographies and/or designs to implement such rollout safeguard procedures.

Implementing production environment changes utilizing standard rollout procedures provides the benefit of a stable production environment at the expense of timeliness. The larger the industrial organization and/or the more complex the code to be changed or implemented, the longer the rollout process cycle typically takes. While this may generally not be as desirable as a speedier rollout of new code, for regulated industries where code rollout is tied to regulatory submission and/or approval processes, short rollout cycle times may be extraordinarily costly and/or may conflict with regulatory timeframes. Typically, however, changes to code must either follow the full rollout process cycle or must be implemented as emergency fixes. Emergency fixes to production environments may require an entire parallel hardware and/or environment pipeline, which is extremely costly (in terms of both initial capital and ongoing maintenance), or must preempt or disrupt any on-cycle changes that are already in the rollout cycle pipeline (e.g., causing delays to on-cycle production changes, which is also not desirable).

In accordance with embodiments herein, these and other deficiencies of previous efforts are remedied by providing systems, apparatus, methods, and articles of manufacture for strategic maintenance of a production environment, e.g., utilizing a Business Rule Management System (BRMS) topology. In some embodiments, for example, rollout cycle length may be reduced for certain types of production environment changes by selectively executing batch files and transformation scripts to edit production tables in a staging environment and testing the modified tables in an emergency fix environment utilizing a modified date override table. Production tables may be selectively copied into the staging environment, for example, and a date override table may be edited to simulate a future date. In some embodiments, data from the production environment may be transformed and loaded into a modified version of a production table in the staging environment. According to some embodiments, the emergency fix environment may be utilized to develop baseline test data, the modified table(s) and the date override table may be loaded into the emergency fix environment, and the baseline test data may be compared to data resulting from an updated test utilizing the modified table(s). In such a manner, for example, a limited testing of table changes may be effectuated through an emergency fix environment without requiring employment of the standard code rollout cycle.

II. Production Environment

Referring first to FIG. 1, a block diagram of a production environment system 100 according to some embodiments is shown. In some embodiments, the production environment system 100 may comprise a plurality of user devices 102*a-n*, a network 104, a third-party device 106, a controller device 110, and/or a database 140. As depicted in FIG. 1, any or all of the devices 102*a-n*, 106, 110, 140 (or any combinations thereof) may be in communication via the network 104. In some embodiments, the production environment system 100 may be utilized to conduct transactions with consumers (or other users) by providing software services, applications, and/or executed transactional code offerings online (e.g., insurance and/or other regulated industry services via the network 104). The controller device 110 may, for example, interface with one or more of the user devices 102*a-n* and/or the third-party device 106 to receive user/consumer input and utilize the input to execute one or more data processing algorithms or models. In a non-limiting exemplary case of insurance or underwriting product services, for example, transactional code, services, and/or applications may be executed by the controller 110 to provide insurance and/or underwriting products and/or services to a plurality of consumers (e.g., via the user devices 102*a-n*).

Fewer or more components 102*a-n*, 104, 106, 110, 140 and/or various configurations of the depicted components 102*a-n*, 104, 106, 110, 140 may be included in the production environment system 100 without deviating from the scope of embodiments described herein. In some embodiments, the components 102*a-n*, 104, 106, 110, 140 may be similar in configuration and/or functionality to similarly named and/or numbered components as described herein. In some embodiments, the production environment system 100 (and/or portion thereof) may comprise a risk assessment and/or underwriting or sales program, system, and/or platform programmed and/or otherwise configured to execute, conduct, and/or facilitate the method 600 of FIG. 6 herein, and/or portions thereof.

The user devices 102*a-n*, in some embodiments, may comprise any types or configurations of computing, mobile electronic, network, user, and/or communication devices that are or become known or practicable. The user devices 102*a-n* may, for example, comprise one or more Personal Computer (PC) devices, computer workstations (e.g., an underwriter workstation), tablet computers such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102*a-n* may comprise devices owned and/or operated by one or more users such as claim handlers, field agents, underwriters, account managers, agents/brokers, customer service representatives, data acquisition partners and/or consultants or service providers, and/or underwriting product customers (or potential customers, e.g., consumers). According to some embodiments, the user devices 102*a-n* may communicate with the controller device 110 via the network 104 to conduct underwriting inquiries and/or processes utilizing transactional code that is modified utilizing a strategic maintenance (i.e., non-standard) rollout process, as described herein.

In such a manner, for example, the results of transactional code execution may be modified by implementation of modified transactional code in a timeframe that is substantially shorter than if standard rollout processes were implemented. Consumers (e.g., utilizing the user devices 102*a-n*) and/or industry entities (e.g., a regulated business entity, such as an insurance company, utilizing the controller 110) may accordingly benefit from more desirable results realized by execution of the modified transactional code instead of having their transactions processed utilizing the original transactional code (which would otherwise occur in the case that the rollout of the modified transactional code was delayed by implementation of a standard code rollout procedure).

In some embodiments, the user devices 102*a-n* may interface with the controller device 110 to effectuate communications (direct or indirect) with one or more other user devices 102*a-n* (such communication not explicitly shown in FIG. 1) operated by other users, for example. In some embodiments, the user devices 102*a-n* may interface with the controller device 110 to effectuate communications (direct or indirect) with the third-party device 106 (such communication also not explicitly shown in FIG. 1). In some embodiments, the user devices 102*a-n* and/or the third-party device 106 may comprise one or more sensors and/or other data acquisition and/or input devices. In some embodiments, input from such devices 102*a-n*, 106 may be provided to the controller device 110, to be utilized as input in a transactional code execution routine to conduct, e.g., claim handling, pricing, risk assessment, line and/or limit setting, quoting, and/or selling or re-selling of an underwriting product (e.g., utilizing a strategic maintenance (i.e., non-standard) rollout process, as described herein).

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the user devices 102*a-n*, the third-party device 106, and/or the database 140. In some embodiments, the network 104 may comprise direct communications links between any or all of the components 102*a-n*, 106, 110, 140 of the system 100. The user devices 102*a-n* may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102*a-n* may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 106, 110, 140 of the system 100. The network 104 may comprise one or more cellular telephone networks with communication links between the user devices 102*a-n* and the controller device 110, for example, and/or may comprise the Internet, with communication links between the controller device 110 and the third-party device 106 and/or the database 140, for example.

The third-party device 106, in some embodiments, may comprise any type or configuration of a computerized processing device such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the user devices 102*a-n* or the controller device 110). The third-party device 106 may, for example, be owned and/or operated by data and/or data service provider such as Dun & Bradstreet® Credibility Corporation (and/or a subsidiary thereof, such as Hoovers™), Deloitte® Development, LLC, Experian™ Information Solutions, Inc., and/or Edmunds.com®, Inc. In some embodiments, the third-party device 106 may supply and/or provide data such as policy information (e.g., governing state data), business and/or other classification data to the controller device 110 and/or the user devices 102*a-n*. In some embodiments, the third-party device 106 may comprise a plurality of devices and/or may be associated with a plurality of third-party entities.

In some embodiments, the controller device 110 may comprise an electronic and/or computerized controller device such as a computer server communicatively coupled to interface with the user devices 102*a-n* and/or the third-party device 106 (directly and/or indirectly). The controller device 110 may, for example, comprise one or more PowerEdge™ M910 blade servers manufactured by Dell®, Inc. of Round Rock, Tex. which may include one or more Eight-Core Intel® Xeon® 7500 Series electronic processing devices. In some embodiments, the controller device 110 may comprise a plurality of processing devices specially-programmed to execute and/or conduct processes that are not practicable without the aid of the controller device 110. The controller device 110 may, for example, execute transactional code modified by a strategic maintenance (i.e., non-standard) rollout process, as described herein, such execution and/or rollout not being capable of being conducted without the benefit of the specially-programmed controller 110. According to some embodiments, the controller device 110 may be located remote from one or more of the user devices 102*a-n* and/or the third-party device 106. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more transactional code programs, modules, and/or routines that facilitate the provision and/or sales of products, e.g., in an online environment, as utilized in various industry data processing applications, such as, but not limited to, insurance and/or risk analysis, and/or handling, processing, pricing, underwriting, and/or issuance of one or more insurance and/or underwriting products and/or claims with respect thereto. According to some embodiments, the controller device 110 may comprise a computerized processing device such as a PC, laptop computer, computer server, and/or other electronic device to manage and/or facilitate transactions and/or communications regarding the user devices 102*a-n*. An insurance company employee, agent, claim handler, underwriter, and/or other user (e.g., customer, consumer, client, or company) may, for example, utilize the controller device 110 to (i) price and/or underwrite one or more products, such as insurance, indemnity, and/or surety products and/or (ii) provide an interface via which a data processing and/or underwriting entity may rollout modified transactional code via a strategic maintenance (i.e., non-standard) rollout process, as described herein.

In some embodiments, the controller device 110 and/or the third-party device 106 (and/or the user devices 102*a-n*) may be in communication with the database 140. The database 140 may store, for example, BRMS topography data, transactional code data, policy data, business classification data, location data obtained from the user devices 102*a-n*, business classification/reclassification and/or policy data defined by the controller device 110, stored data defining variable values, code rollout and/or rollout environment data, and/or instructions that cause various devices (e.g., the controller device 110 and/or the user devices 102*a-n*) to operate in accordance with embodiments described herein. The database 140 may store, for example, one or more batch job files (e.g., the example batch job file 442-3 of FIG. 4 herein), a date override table (e.g., the example data table 544-3 of FIG. 5 herein), data transformation scripts, data defining a segmentation of BRMS and/or code rollout environments, and/or testing routine and/or comparison data (e.g., thresholds and/or logic). In some embodiments, the database 140 may comprise any type, configuration, and/or quantity of data storage devices that are or become known or practicable. The database 140 may, for example, comprise an array of optical and/or solid-state hard drives configured to store policy and/or location data provided by (and/or requested by) the user devices 102*a-n*, business classification data, business reclassification data, transactional code, code rollout routing and/or versioning data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. In some embodiments, and in accordance with one possible BRMS topology, a dedicated database 140 (and/or portion thereof) and/or a dedicated controller device 110 (and/or portion thereof, such as a cluster of processing devices and/or a virtual machine instance) may be provided for each "environment" described herein (e.g., one controller device 110 and one database device 140 for the "production environment" depicted in FIG. 1, with other instances of controller devices 110 and/or database devices 140 being implemented for other environments (not depicted), such as various testing, fail-over, and/or code rollout environments). Any or all of the user devices 102*a-n* or third-party device 106 may comprise the database 140 or a portion thereof, for example, and/or the controller device 110 may comprise the database or a portion thereof.

III. Business Rule Management System (BRMS) Environments

Figure 2:
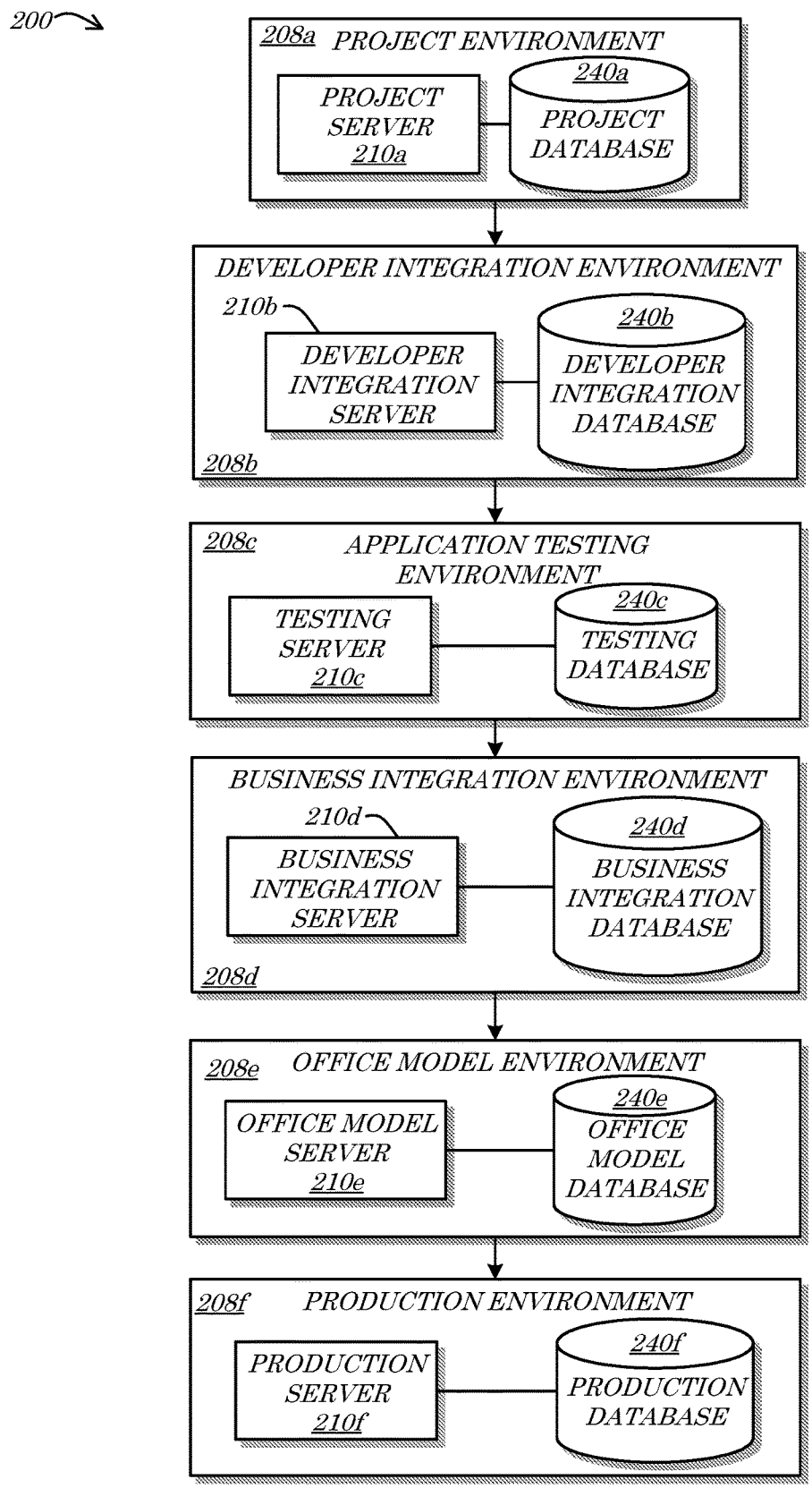
FIG. 2 is a block diagram of a Business Rule Management System (BRMS) topology according to some embodiments.

Turning now to FIG. 2, a block diagram of a Business Rule Management System (BRMS) topology (i.e., system architecture) 200 is shown. In some embodiments, the BRMS topology 200 may comprise a plurality of distinct operational environments 208*a-f*. The operational environments 208*a-f* may, as depicted, for example, be directed to and/or define an application, service, and/or software code rollout pathway. A first operational environment 208*a* may comprise a "project" environment in which code, objects, attributes, procedures, functions, services, and/or instructions are developed, for example, by utilizing different sets of code snippets stored in a source code database (not shown). In some embodiments, a second operational environment 208*b* may comprise a "developer integration" environment in which the developed code is integrated and initially tested. Different procedures, functions, and/or services coded by different developers, for example, may be integrated to create a software module that is tested to ensure that the different procedures, functions, and/or services work together as desired. According to some embodiments, a third operational environment 208*c* may comprise an "application testing" environment in which the integrated software module is tested with other integrated modules (e.g., to define an application) to ensure that the modules work together as desired. In some embodiments, a fourth operational environment 208*d* may comprise a "business integration" environment in which user acceptance of the integrated modules (e.g., software application) is tested. Business Intelligence (BI) and/or other stakeholders in the industry functionality of the code being developed may, for example, test the application to ensure desired results and/or performance. In some embodiments, a fifth operational environment 208e may comprise an "office model" environment in which the application is executed in a simulated production environment to provide for full functional testing and Quality Assurance (QA). According to some embodiments, a sixth operational environment 208f may comprise a "production" environment in which the code, when migrated thereto and executed therein, defines "live" transactional processing with respect to end-user and/or consumer inputs (e.g., provided in an online environment).

In some embodiments, each environment 208a-f of the BRMS topology 200 may comprise (and/or be defined by) a respective server 210a-f and/or database 240a-f. The respective servers 210a-f and/or databases 240a-f may comprise distinct hardware components in communication with each other, as depicted, or may be defined by one or more virtual machines, partitions, segments, cells, etc. The type and quantity of servers 210a-f and databases 240a-f may vary depending upon the bandwidth, processing, and/or organizational needs of a particular industrial entity implementing the BRMS topology 200. Larger entities with more complex and/or mission-critical production transactional code may, for example, implement the six (6)-tiered server 210a-f and database 240a-f topography depicted, while smaller organizations (and/or those with less complex or critical transaction code) may implement a topography with fewer hardware and/or environment 208a-f components.

According to some embodiments, the environments 208a-f of the BRMS topology 200 may comprise distinct "cells" or administrative domains of managed nodes (e.g., a group of servers 210a-f and/or node manager services) of an Operational Decision Management (ODM) topography or system architecture. The BRMS topology 200 may comprise, for example, a phased software code deployment topography that utilizes the six (6) depicted environments 208a-f (or cells) mapped to successive code deployment phases. Any code to be deployed to the production environment 208f, for example, may first be required to pass from the development environment 208a and through each of the developer integration environment 208b, the application testing environment 208c, the business integration environment 208d, and the office model environment 208e. Each environment may be accessible by a particular group or groups of users (e.g., developers, testers, business analysts, database administrators, etc.) and/or may be associated with a particular process or set of procedures. The developer integration environment 208b may be accessible (e.g., via appropriately classed and permissioned credentials) for a first group of individuals or accounts, such as developers, for example, while the office model environment 208e may not be accessible to the first group. Each group that is provided access to each environment 208a-f or code rollout phase may, in some embodiments, be tasked or associated with execution of one or more specific code development, testing, modeling, quality assurance, integration, and/or other desired routines. In such a manner, for example, by the time that developed (or modified) code is migrated into the production environment 208f, it will have gone through a plurality of phased steps and procedures implemented by and/or associated with various code deployment user groups.

Fewer or more components 208a-f, 210a-f, 240a-f and/or various configurations of the depicted components 208a-f, 210a-f, 240a-f may be included in the BRMS topology 200 without deviating from the scope of embodiments described herein. In some embodiments, the components 208a-f, 210a-f, 240a-f may be similar in configuration and/or functionality to similarly named and/or numbered components as described herein. In some embodiments, the BRMS topology 200 (and/or portion thereof) may comprise a strategic maintenance program, system, and/or platform programmed and/or otherwise configured to execute, conduct, and/or facilitate the method 600 of FIG. 3 herein, and/or portions thereof. According to some embodiments, one or more of the environments 208a-f of the BRMS topology 200 may be specifically circumvented by execution of the method 600 of FIG. 3 and/or one or more portions and/or related hardware or systems thereof.

IV. Strategic BRMS Maintenance

Figure 3:
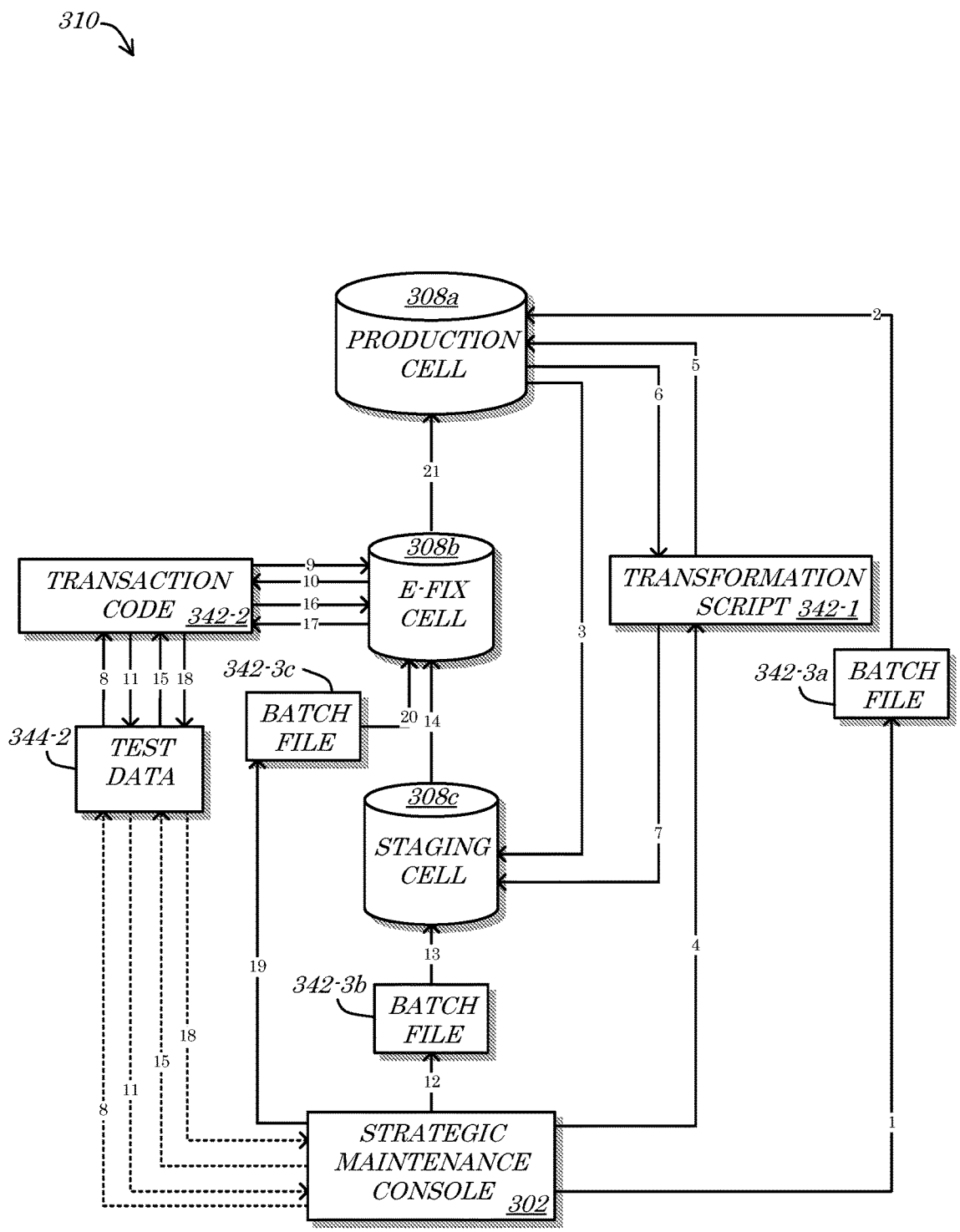
FIG. 3 is a block diagram of a system according to some embodiments.

Turning now to FIG. 3, a block diagram of a system 310 according to some embodiments is shown. In some embodiments, the system 310 may comprise a strategic maintenance console 302 in communication with a production cell 308a, an emergency fix or "e-fix" cell 308b, and/or a staging cell 308c. The production cell 308a may comprise an industry production or run-time (e.g., "live") environment, for example, and/or the system 310 may comprise and/or reside on or in a server device (not shown in FIG. 3; e.g., the controller 110 of FIG. 1 and/or one or more of the servers 210a-f of FIG. 2 herein). According to some embodiments, the strategic maintenance console 302 may comprise a computerized and/or electronic device utilized to execute one or more programs, such as a transformation script 342-1 and/or transaction code 342-2. In accordance with some embodiments, the strategic maintenance console 302 may execute and/or utilize one or more batch files 342-3a, 342-3b, 342-3c and/or test data 344-2 to rollout code and/or data modifications in the production cell 308a, e.g., without the need to progress through standard rollout phases or environments (not shown in FIG. 3; such as the non-production environments 208a-e of FIG. 2 herein).

In some embodiments, the strategic maintenance console 302 may call, execute, initiate, and/or trigger a first batch file 342-3a, e.g., via a first path "1" as depicted in FIG. 3. According to some embodiments, the first batch file 342-3a may comprise a listing of production environment tables and/or an indication of which tables are desired for editing and/or modification. The first batch file 342-3a may, for example, indicate and/or identify each of a date override table and another table (or plurality of tables) desired for editing. In some embodiments, the first batch file 342-3a may comprise a job (e.g., an Autosys-executed job) that sends a command to the production cell 308a to retrieve copies of the desired tables, e.g., via a second path "2". According to some embodiments, the production cell 308a may receive the request/command and may respond by providing and/or transmitting copies of the desired tables to (or into) the staging cell 308c, e.g., via a third path "3". In such a manner, for example, the staging cell 308c may be provided with updated and/or production-version table structures with minimal disruption to the production cell 308a.

According to some embodiments, the strategic maintenance console 302 may call, execute, initiate, and/or trigger the transformation script 342-1, e.g., via a fourth path "4". The transformation script 342-1 may comprise, for example, a query and/or data transformation instructions that, e.g., call, identify, and/or request data from the production cell 308a, such as via a fifth path "5". In some embodiments, the data requested or called may be data that populates any or all tables for which the structures where copied, e.g., via the third path "3". According to some embodiments, the production cell 308a may receive the request via the fifth path "5". In some embodiments, such as in response to the receiving of the request, the production cell 308a may provide and/or return the requested, queried, and/or called data, e.g., via a sixth path "6". In some embodiments, the transformation script 342-1 may receive the data (e.g., via the sixth path "6") and apply one or more transformation and/or data processing algorithms or steps. The transformation script 342-1 may, for example, transform the data in accordance with a desired reference table and/or reference data modification. According to some embodiments, the transformed data may be provided and/or transmitted by the transformation script 342-1 to the staging cell 308c. The transformation script 342-1 may, for example, store or load the transformed data into the copies of the desired tables in the staging cell 308c. Some or all of the data transformations and/or the transformed data may be directly entered or input. In the case that the date override table is modified to include one or more date entries that differ from a current (or otherwise applicable) date, for example, the desired date value(s) may be directly input into the date override table, e.g., in the staging cell 308c.

In some embodiments, pre-modification testing may be accomplished in the e-fix cell 308b by establishing a test data baseline. Test data 344-2 may, for example, be input into the transaction code 342-2, e.g., via an eighth path "8". In some embodiments, the test data 344-2 may be triggered and/or transmitted by the strategic maintenance console 302. According to some embodiments, the transaction code 342-2 may comprise a copy of actual production transaction code or applications that operate in (or on) the production cell 308a. In some embodiments, the transaction code 342-2 may comprise the actual run-time production code, but executed with the test data 344-2 (as opposed to production and/or actual consumer transaction data) and/or utilizing one or more variable or path values that cause the transaction code 342-2 to utilize copies of the requisite data tables (e.g., the date override table and/or the table(s) desired for editing) stored in the e-fix cell 308b. The transaction code 342-2 may, for example, call and/or access the e-fix cell 308b, e.g., via a ninth path "9". In some embodiments, data may be returned by the e-fix cell 308b to the transaction code 342-2 (e.g., an executed instance thereof), e.g., via a tenth path "10", and/or the returned data may be utilized by the transaction code 342-2 to define a baseline result. The baseline result may, in some embodiments, be stored and/or defined as a part of the test data 344-2 and/or may be forwarded and/or provided to the strategic maintenance console 302, e.g., via an eleventh path "11".

According to some embodiments, the strategic maintenance console 302 may call, execute, initiate, and/or trigger a second batch file 342-3b, e.g., via a twelfth path "12" as depicted in FIG. 3. According to some embodiments, the second batch file 342-3b may comprise a listing of data tables and/or an indication of which tables are desired for editing and/or modification (or have already been edited and/or modified). The second batch file 342-3b may, for example, indicate and/or identify each of the date override table and the other table (or plurality of tables) that have been edited, modified, and/or loaded with transformed data. In some embodiments, the second batch file 342-3b may comprise a job (e.g., an Autosys-executed job) that sends a command to the staging cell 308c to send copies of the desired tables, e.g., via a thirteenth path "13". According to some embodiments, the staging cell 308c may receive the request/command and may respond by providing and/or transmitting copies of the desired (e.g., modified) tables to (or into) the e-fix cell 308b, e.g., via a fourteenth path "14". In such a manner, for example, the e-fix cell 308b may be provided with modified and/or staging-version table structures.

In some embodiments, post-modification testing may be accomplished in the e-fix cell 308b by establishing modified test results. The test data 344-2 may, for example, be input into the transaction code 342-2, e.g., via a fifteenth path "15". In some embodiments, the test data 344-2 may be triggered and/or transmitted by the strategic maintenance console 302. According to some embodiments, the transaction code 342-2 may comprise a copy of actual production transaction code or applications that operate in (or on) the production cell 308a. In some embodiments, the transaction code 342-2 may comprise the actual run-time production code, but executed with the test data 344-2 (as opposed to production and/or actual consumer transaction data) and/or utilizing one or more variable or path values that cause the transaction code 342-2 to utilize modified copies of the requisite data tables (e.g., the modified date override table and/or the other modified table(s)) stored in the e-fix cell 308b. The transaction code 342-2 may, for example, call and/or access the e-fix cell 308b, e.g., via a sixteenth path "16". In some embodiments, data may be returned by the e-fix cell 308b to the transaction code 342-2 (e.g., an executed instance thereof), e.g., via a seventeenth path "17", and/or the returned data may be utilized by the transaction code 342-2 to define a modified result. The modified result may, in some embodiments, be stored and/or defined as a part of the test data 344-2 and/or may be forwarded and/or provided to the strategic maintenance console 302, e.g., via an eighteenth path "18".

According to some embodiments, the baseline result and the modified result may be compared, e.g., by or via the strategic maintenance console 302. In the case that the modified result (analyzed by itself and/or in comparison to the baseline result) is computed to be within desired outcome levels (e.g., in relation to one or more thresholds and/or logical pathways), the strategic maintenance console 302 may call, execute, initiate, and/or trigger a third batch file 342-3c, e.g., via a nineteenth path "19" as depicted in FIG. 3. According to some embodiments, the third batch file 342-3c may comprise a listing of data tables and/or an indication of which edited and/or modified tables are desired for migration to the production cell 308a. The third batch file 342-3c may, for example, indicate and/or identify the other table (or plurality of tables) that have been edited, modified, and/or tested with the transformed data (e.g., to derive the modified result). In some embodiments, the third batch file 342-3c may comprise a job (e.g., an Autosys-executed job) that sends a command to the e-fix cell 308b to send or migrate copies of the desired tables, e.g., via a twentieth path "20". According to some embodiments, the e-fix cell 308b may receive the request/command and may respond by providing and/or transmitting copies of the desired (e.g., modified) tables to (or into) the production cell 308a, e.g., via a twenty-first path "21". In such a manner, for example, the production cell 308a may be provided with modified and/or staging-version table structures to effectuate code and/or data table changes within a production environment for a given industry. In some embodiments, as described herein, such a system 310 may allow the production cell 308a to be modified in a timeframe that is substantially smaller than if standard code/data table rollout procedures had been utilized.

In some embodiments, any or all of the batch files 342-3a, 342-3b, 342-3c may comprise similar or identical flat files and/or contain similar or identical data. All three batch files 342-3a, 342-3b, 342-3c may comprise a listing, for example, of all (or a specific subset of) production data tables and an indication, for each such table, defining whether such table is to be included in the job executed by (or in response to) the particular respective batch file 342-3a, 342-3b, 342-3c. Each of the batch files 342-3a, 342-3b, 342-3c may, for example, comprise a listing of tables desired for modification along with an indication that such tables are desired to be included in the respective job or command. In some embodiments, the first and second batch files 342-3a, 342-3b may also comprise a listing or identification of a date override table and/or a respective date override value, while the third batch file 342-3c may not include the date override table, value, and/or a job-indication thereof.

According to some embodiments, any or all of the paths may comprise electronic communications and/or network pathways. Any or all of these depicted and/or described paths with respect to FIG. 3 may comprise any number, type, and/or configuration of pathways and/or associated physical objects that are or become known or practicable. While four (4) different pathways ("8", "11", "15", and "18") are depicted and described as providing communicative functionality between the strategic maintenance console 302 and the test data 344-2 and/or the transaction code 342-2, for example, all communications along those four (4) pathways may be effectuated through or via a single object or medium such as a single wire, cable (e.g., coaxial), trace, and/or or connection (e.g., a packet-switched communication session connection, a cellular wireless communications session, etc.). In some embodiments, different communicative transmissions and/or pathways may be effectuated and/or implemented, controlled, and/or managed by different processing devices and/or components. The system 310 may, for example, utilize and/or employ a first server and/or processing unit or thread to effectuate the first ("1") and fourth ("4") pathways, while a second server and/or processing unit or thread may effectuate the twelfth ("12") and nineteenth ("19") pathways. The consecutive numbering and/or descriptions of the different pathways are utilized for convenience of description only, are not limiting, and are not necessarily indicative of chronological or temporal relationships between the pathways or related functionalities. Particularly in the case that different processing units of the system 310 effectuate different pathways, for example, such pathways (e.g., the fourth ("4") and ninth ("9") pathways) may be effectuated simultaneously (e.g., in the case that the system 310 is configured to provide multi-threaded processing).

Figures 4, 5:
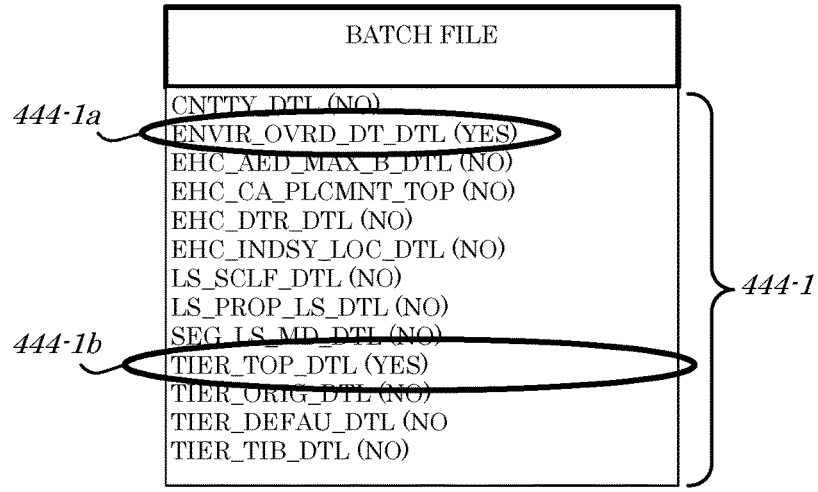
FIG. 4 is a diagram of a batch job file according to some embodiments.
FIG. 5 is a diagram of a data table according to some embodiments.

Referring now to FIG. 4, a diagram of a batch job file 442-3 according to some embodiments is shown. In some embodiments, the batch job file 442-3 may, for example, comprise a flat file, script, Autosys, command, and/or other executable and/or referential file that stores job data 444-1. According to some embodiments, the batch job file 442-3 depicted in FIG. 4 may comprise a text or configuration file utilized by a batch or executable job program, script, and/or command string (not separately shown). In some embodiments, the batch job file 442-3 may be utilized to query, pull, call, and/or load data table structures and/or data (e.g., attributes and/or stored data elements or values), e.g., from one topology environment or cell to another. The job data 444-1 may, for example, comprise (as depicted) a listing of data tables and a related indication for each table regarding whether the table should be acted upon by the job. In the non-limiting example job data 444-1 of FIG. 4, most tables are identified along with a "NO" indicator, which may cause such tables to not be included in any job, command, or action (e.g., copying and/or data pull) associated with the batch job file 442-3. According to some embodiments, and as depicted in the non-limiting example job data 444-1 of FIG. 4, each of a first table trigger 444-1a and a second table trigger 444-1b may be identified and/or defined by the batch job file 442-3. The "ENVIR_OVRD_DT_DTL" table (e.g., a date override table) and the "TIER_TOP_DTL" table (e.g., an insurance policy pricing factor table) may, for example, be flagged with a "YES" indicator that causes those tables to be included in the job/action associated with the batch job file 442-3. In the case that the batch job file 442-3 is utilized to pull production data tables from a production environment into a staging environment, for example, such copy/import job may only include the two (2) tables 444-1a, 444-1b identified with the "YES" trigger, with all other tables not identified with the trigger being ignored by the job. In such a manner, a user may edit the batch job file 442-3 to cause the job to include any set or subset of tables that are desired for modification or editing.

In some embodiments, fewer or more triggered tables 444-1a, 444-1b may be included in the batch job file 442-3, as is selectively desired. In the case that the batch job file 442-3 is utilized to migrate modified data tables from a staging or emergency fix environment to a production environment, for example, the first table trigger 444-1a (e.g., the date override table) may not be identified and/or selected for migration (e.g., it would typically not be desirable to override the operational date settings in the production environment). According to some embodiments, fewer or more data fields and/or data items comprising the job data 444-1 than are shown may be included in the batch job file 442-3. Only a portion of one or more files and/or data lists or stores is necessarily shown in FIG. 4, for example, and other data, data types, database fields, columns, structures, orientations, quantities, and/or configurations may be utilized without deviating from the scope of some embodiments. Further, the job data 444-1 depicted in the batch job file 442-3 is provided solely for exemplary and illustrative purposes and does not limit the scope of embodiments described herein.

Turning to FIG. 5, a diagram of a data table 544-3 according to some embodiments is shown. In some embodiments, the data table 544-3 may comprise a date override table that permits and/or effectuates testing of table and/or data modifications in a staging and/or emergency fix environment that is, e.g., only one phase or level removed from a production environment (e.g., a low-level or "deep" testing level environment), as described herein. The data table 544-3 may comprise, for example, an environment ("ENV.") field 544-3a, a plurality of date fields 544-3b, 544-3c, 544-3d, 544-3e, an update entity ("UPDT_ENT") filed 544-3f, and/or a last update ("LST_UPDT") field 544-3g. In some embodiments, the data table 544-3 may be accessed, queried, and/or consulted by one or more processes executed in a particular environment to determine or identify an operational date to utilize in execution of the processes. Transaction code operating in a production environment may access the data table 544-3, for example, to determine a current date and/or time, various effective dates utilized to apply different rules sets, etc. According to some embodiments, executed code may point to and/or query a specific row or set of data elements in the data table 544-3. In the case of the data table 544-3 being implemented in a staging and/or emergency fix environment, for example, transaction code executed in the environment may access the environment field 544-3*a* of the data table 544-3 to identify one or more data rows applicable to the current operational environment (i.e., the staging or emergency fix environment, as the case may be). As depicted by the circled data row for the "EFIX" value stored in the environment field 544-3*a*, for example, transactional code operating in an "e-fix" environment or cell may pull one or more operational date values from one or more of the plurality of date fields 544-3*b*, 544-3*c*, 544-3*d*, 544-3*e*. In such a manner, for example, a user (or script executed by or on behalf of a user) may edit or modify one or more of the values stored in the plurality of date fields 544-3*b*, 544-3*c*, 544-3*d*, 544-3*e* to cause the transactional code in the "e-fix" environment to produce results (e.g., modified results based on test data) based on the one or more modified date values (e.g., to permit simulation of different effective and/or transactional dates with respect to the transactional code execution).

In some embodiments, fewer or more data fields than are shown may be included in and/or associated with the data table 544-3. Only a portion of one or more databases and/or other data stores is necessarily shown in FIG. 5, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

Figure 6:
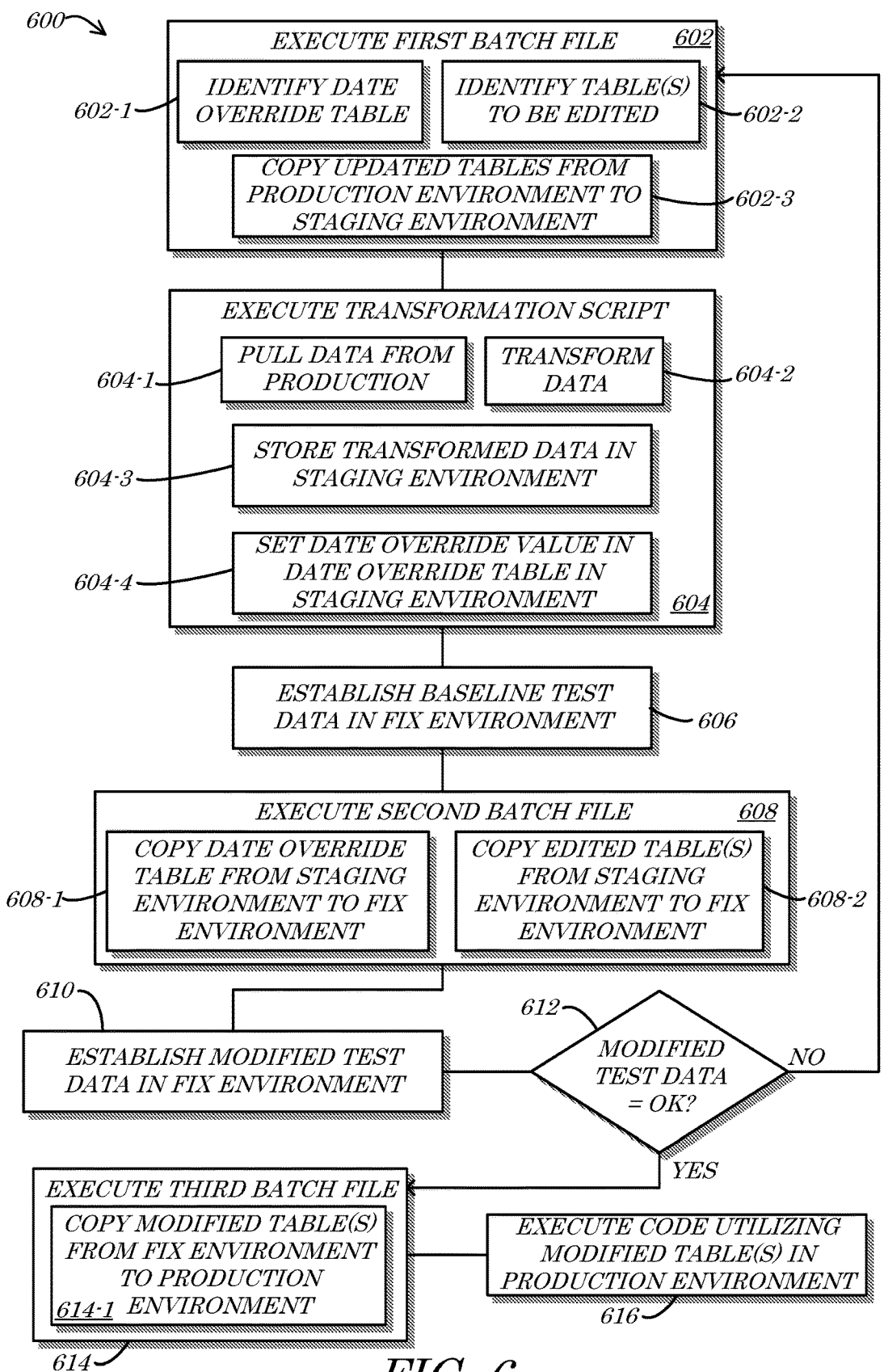
FIG. 6 is a flow diagram of a method according to some embodiments.

Turning now to FIG. 6, a flow diagram of a method 600 according to some embodiments is shown. In some embodiments, the method 600 may be performed and/or implemented by and/or otherwise associated with one or more specialized and/or specially-programmed computers (e.g., the user devices 102*a-n*, the controller device 110, the servers 210*a-f*, the system 310, and/or the strategic maintenance console 302, of FIG. 1, FIG. 2, and/or FIG. 3 herein), specialized computers, computer terminals, computer servers, computer systems and/or networks, and/or any combinations thereof (e.g., by one or more multi-threaded and/or multi-core processing units of an insurance company data processing system). In some embodiments, the method 600 may be embodied in, facilitated by, and/or otherwise associated with various input mechanisms and/or interfaces (not explicitly shown).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 140, 240*a-f*, 740, 840*a-e* and/or the environments/cells 208*a-f*, 308*a-c* of FIG. 1, FIG. 2, FIG. 3, FIG. 7, FIG. 8A, FIG. 8B, FIG. 8C, FIG. 8D, and/or FIG. 8E herein) may store thereon instructions that when executed by a machine (such as a computerized processor) result in performance according to any one or more of the embodiments described herein.

According to some embodiments, the method 600 may comprise executing (e.g., by an electronic processing device) a first batch file, at 602. The first batch file may, for example, comprise an Autosys job and/or other executable that identifies data table structures and/or related data desired for copying. In some embodiments, the first batch file (and/or configuration or run-time input thereof) may define and/or identify one or more desired data tables such as a date override table, at 602-1, and/or at least one table to be edited, at 602-2. In some embodiments, the executing of the batch file and/or job may cause the identified tables (and/or data and/or structures thereof) to be copied from a first environment to a second environment (e.g., from a first data storage device to a second data storage device). The execution of the batch job may, for example, comprise copying the identified date override table and table(s) to be edited from a production environment to a staging environment, at 602-3.

In some embodiments, the method 600 may comprise executing (e.g., by the electronic processing device) a transformation script, at 604. The transformation script may, for example, comprise a query and/or other command or instruction set that causes a location, identification, movement, transformation, and/or storage of one or more data elements, variables, and/or values. The script may, in some embodiments, identify data and pull or acquire the identified data from the production environment, at 604-1. According to some embodiments, some or all of the data may be transformed, at 604-2. The script may define coded instructions, for example, that modify, rearrange, sort, filter, and/or utilize the identified data elements in one or more mathematical and/or logical algorithms or formulas (e.g., actuarial formulas). In some embodiments, the data may be transformed based on input, such as input received and/or defined by a user of a strategic maintenance system. Such a user may enter or define, for example, an updated or modified value for one or more of the data elements, and/or may define or select a formula or other transformational procedure to apply to one or more of the identified data elements. In some embodiments, the transformed data (and/or other identified data that is not transformed) may be stored in the staging environment, at 604-3. According to some embodiments, such as in the case that the identified and/or transformed data is related to one or more of the identified data tables, the data may be stored in the copies of the data tables in the staging environment. In the case that the data and/or transformed data comprises a date override value, for example, the date override value may be set, modified, and/or established in the data override table in the staging environment, at 604-4. In some embodiments, the transformation script may comprise one or more instructions and/or commands to edit or modify one or more of the date override table and the at least one other table. The transformation script may, for example, modify one or more of the identified tables to define one or more modified versions thereof.

According to some embodiments, the method 600 may comprise establishing baseline test data (e.g., in a specific environment such as an emergency fix or "e-fix" environment), at 606. Production transactional code (and/or a copy or version thereof) may, for example, be executed (e.g., by the electronic processing device) utilizing test data to derive and/or achieve one or more transactional results. In the non-limiting and ongoing example of an insurance industry transactional code execution, the test data may comprise example or simulated insurance policy and/or underwriting information and the result derived from execution of the code may comprise an insurance policy (or other underwriting product) pricing value (e.g., a premium, limit, and/or deductible amount value). According to some embodiments, the baseline test data may be established by executing the transactional code in the e-fix environment and/or utilizing data stored therein (e.g., copies of data tables from the production environment).

In some embodiments, the method 600 may comprise executing (e.g., by the electronic processing device) a second batch file, at 608. The second batch file may, for example, comprise an Autosys job and/or other executable that identifies data table structures and/or related data desired for copying. In some embodiments, the second batch file (and/or configuration or run-time input thereof) may define and/or identify one or more desired data tables such as the date override table and/or the at least one table to be edited, e.g., that were copied into the staging environment, at 602-3. In some embodiments, the executing of the batch file and/or job may cause the identified tables (and/or data and/or structures thereof) to be copied from a first environment to a second environment (e.g., from a first data storage device to a second data storage device). The execution of the batch job may, for example, comprise copying the identified and/or modified date override table, at 608-1, and/or the table(s) that have been modified/edited, at 608-2, from the staging environment to the e-fix environment.

According to some embodiments, the method 600 may comprise establishing updated and/or modified test data (e.g., in a specific environment such as the emergency fix or "e-fix" environment), at 610. Production transactional code (and/or a copy or version thereof) may, for example, be executed (e.g., by the electronic processing device) utilizing the test data (e.g., that was utilized to establish the baseline test data at 606) to derive and/or achieve one or more transactional results. In the non-limiting and ongoing example of an insurance industry transactional code execution, the test data may comprise example or simulated insurance policy and/or underwriting information and the result derived from execution of the code may comprise an insurance policy (or other underwriting product) pricing value (e.g., a premium, limit, and/or deductible amount value). According to some embodiments, the modified test data may be established by executing the transactional code in the e-fix environment and/or utilizing data stored therein (e.g., the copies of the modified data tables from the staging environment).

In some embodiments, the method 600 may comprise computing, identifying, and/or determining whether the modified test data is acceptable, at 612. The modified test data, derived from execution of the transaction code utilizing the modified data tables for example, may be compared and/or analyzed with respect to the baseline test data and/or with respect to one or more thresholds and/or logical analysis routines. One or more differences (e.g., quantitative and/or qualitative) between the baseline test data and the modified test data may be determined, in some embodiments, and the one or more differences may be compared to one or more predetermined thresholds and/or logical requirements to compute whether the modified data falls within acceptable ranges. In some embodiments, such as in the example case where the results define an insurance policy pricing point, the modified pricing point may be compared to the baseline pricing point to determine whether a difference therebetween falls below an acceptable threshold. According to some embodiments, the pricing point result may or may not be analyzed or compared, and other data may be analyzed. It may be determined, for example, that certain variables (e.g., deductible or limit levels) are not intended to be modified or affected by the changes to the data tables, and such variables may be compared between the baseline and modified data to ensure that no adverse effects are realized. In some embodiments, in the case that the modified results are determined to not be in accordance with desired parameters, the method 600 may return to the first batch file execution at 602 and/or may proceed to allow a user to input additional (and/or corrected) table and/or data modifications (e.g., modifications to the batch files and/or the transformation script). The method 600 may be repeated utilizing the newly input changes to repeat the process until the modified results are determined to be within acceptable levels (and/or are analyzed to verify that no unintentional adverse processing effects have occurred).

According to some embodiments, in the case that it is computed that the modified results are acceptable and/or have resulted in no adverse effects, the method 600 may proceed to execute (e.g., by the electronic processing device) a third batch file, at 614. The third batch file may, for example, comprise an Autosys job and/or other executable that identifies data table structures and/or related data desired for copying. In some embodiments, the third batch file (and/or configuration or run-time input thereof) may define and/or identify one or more desired data tables, such as the at least one modified table, e.g., that was copied into the e-fix environment, at 608-2. In some embodiments, the executing of the batch file and/or job may cause the identified table(s) (and/or data and/or structures thereof) to be copied from a first environment to a second environment (e.g., from a first data storage device to a second data storage device). The execution of the batch job may, for example, comprise copying the identified and/or modified table(s) from the e-fix environment to the production environment, at 614-1. In such a manner, for example, the production environment may be selectively and/or partially modified by implementing data lookup and/or reference table modifications without requiring a standard or complete BRMS topography code/modification rollout cycle.

In some embodiments, the method 600 may comprise executing (e.g., by the electronic processing device) production transactional code, at 616. The code may be executed, for example, utilizing production data and the modified tables and/or data migrated into the production environment via the abbreviated code rollout procedure of the method 600, e.g., to derive and/or achieve one or more live-environment transactional results. In the non-limiting and ongoing example of an insurance industry transactional code execution, the production data may comprise actual insurance policy and/or underwriting information and the result(s) derived from execution of the code may comprise an insurance policy (or other underwriting product) pricing value (e.g., a premium, limit, and/or deductible amount value) that is, e.g., derived utilizing updated reference data, parameters, variables, etc. According to some embodiments, the production result data may be established by executing the transactional code in the production environment and/or utilizing data stored therein (e.g., the copies of the modified data tables migrated from the e-fix environment).

V. Strategic BRMS Maintenance Apparatus and Articles of Manufacture

Figure 7:
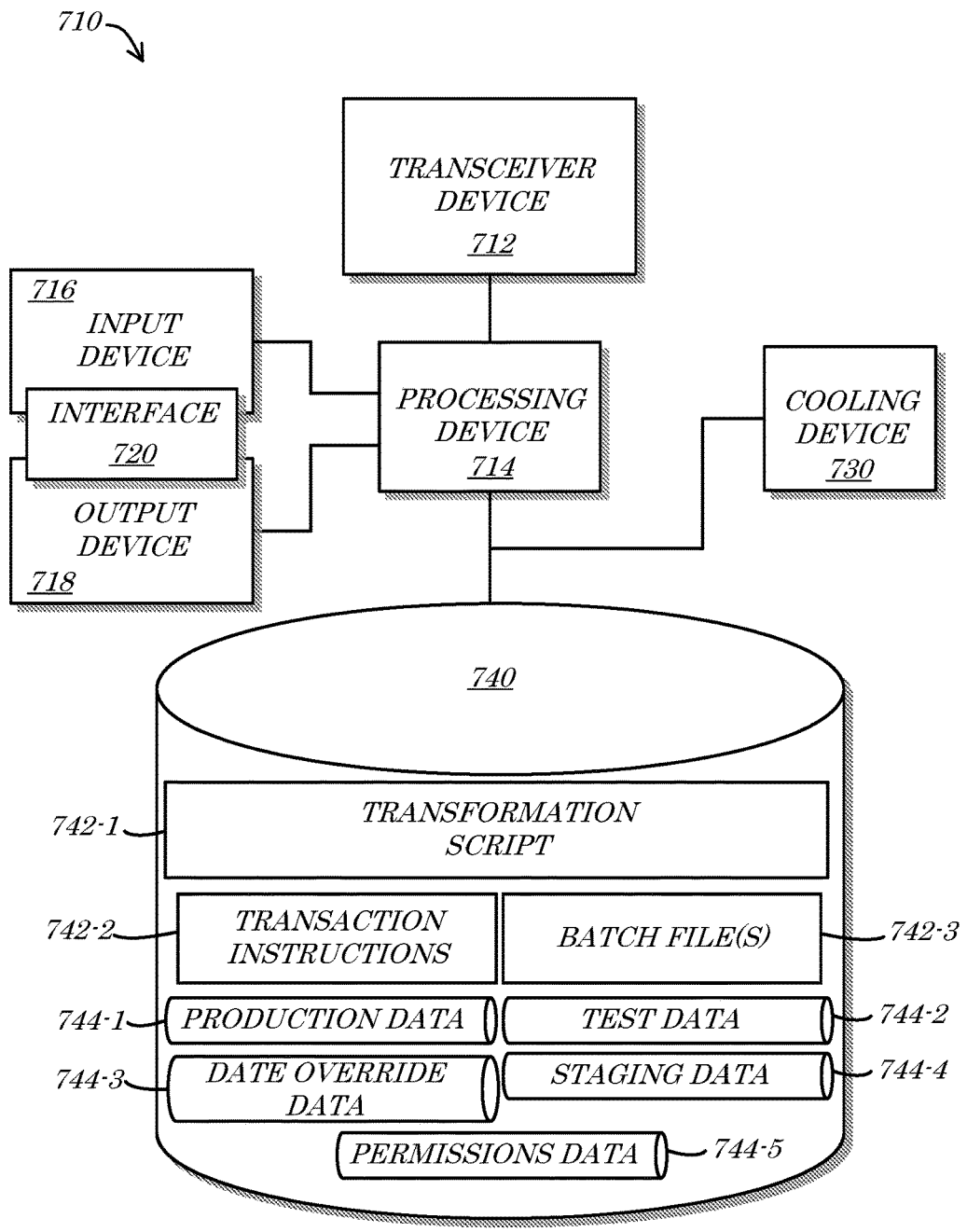
FIG. 7 is a block diagram of an apparatus according to some embodiments.
Figure 8A:
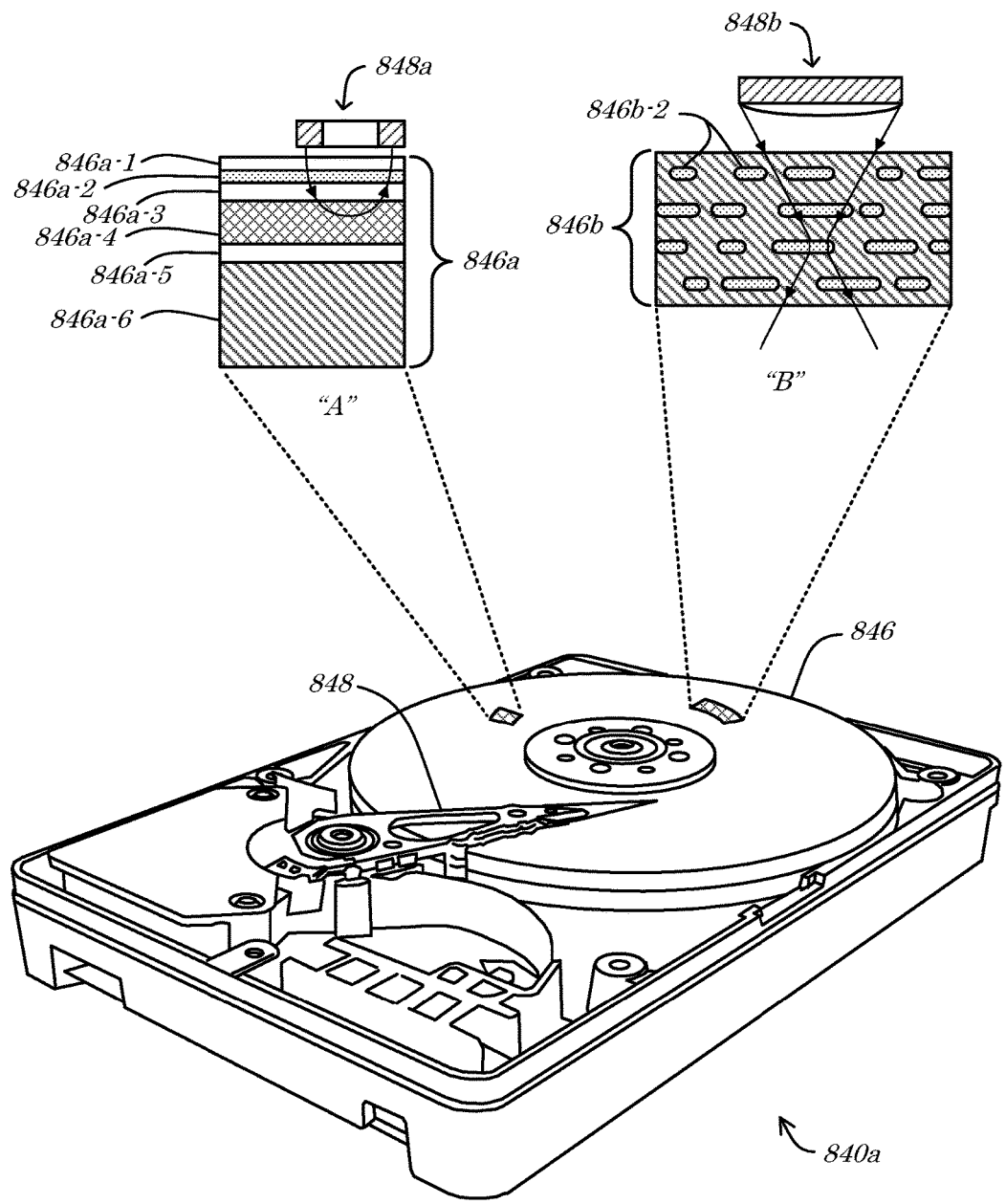
FIG. 8A, FIG. 8B, FIG. 8C, FIG. 8D, and FIG. 8E are perspective diagrams of exemplary data storage devices according to some embodiments.
Figure 8B:
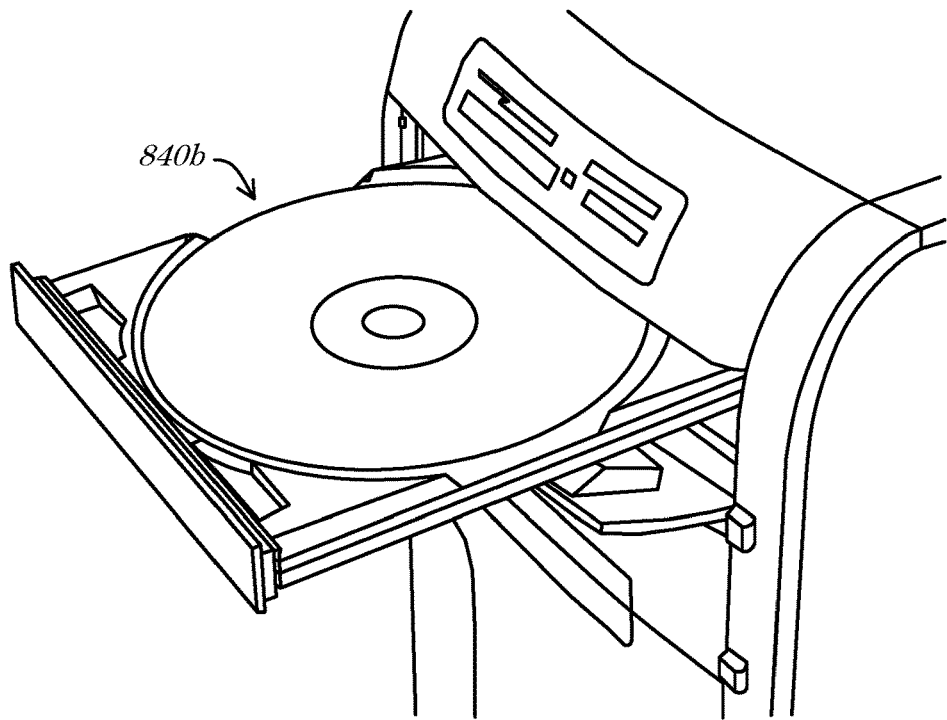
Figure 8C:
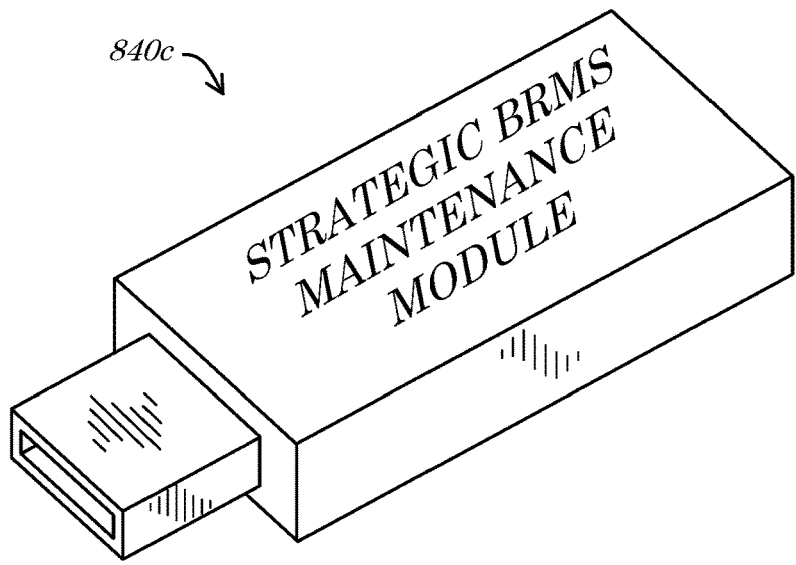
Figure 8D:
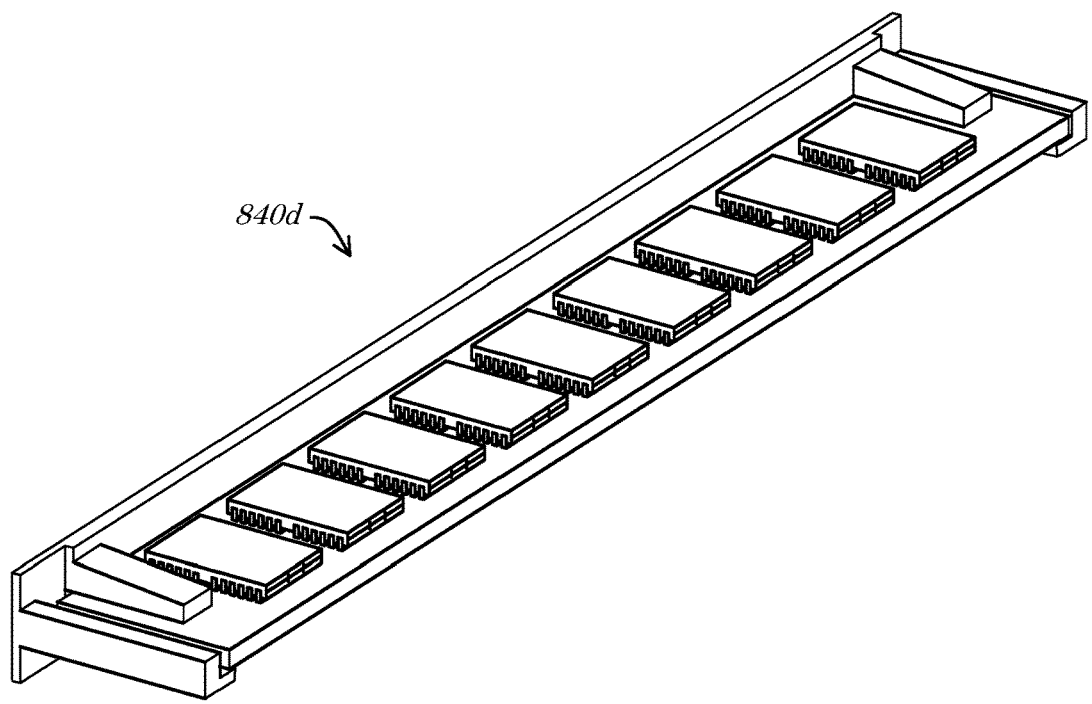
Figure 8E:
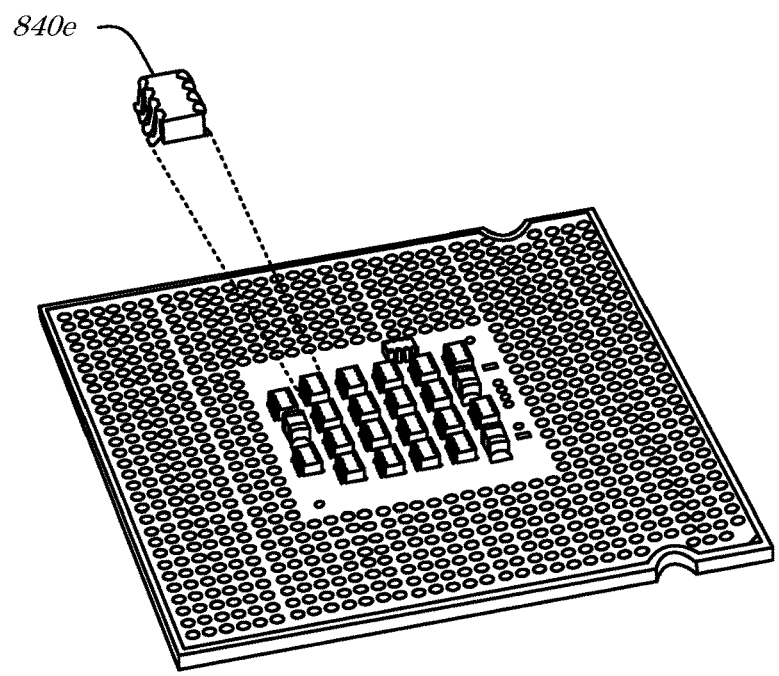

Turning to FIG. 7, a block diagram of an apparatus 710 according to some embodiments is shown. In some embodiments, the apparatus 710 may be similar in configuration and/or functionality to any of the user devices 102*a-n*, 302, the third-party device 106, the environments/cells 208a-f, 308a-c and/or the controller devices/servers/system 110, 210a-f, 310 of FIG. 1, FIG. 2, and/or FIG. 3 herein, and/or may otherwise comprise a portion of the systems 100, 200, 310 of FIG. 1, FIG. 2, and/or FIG. 3 herein. The apparatus 710 may, for example, execute, process, facilitate, and/or otherwise be associated with the method 600 described in conjunction with FIG. 6 herein, and/or one or more portions thereof. In some embodiments, the apparatus 710 may comprise a transceiver device 712, one or more processing devices 714, an input device 716, an output device 718, an interface 720, a cooling device 730, and/or a memory device 740 (storing various programs and/or instructions 742 and data 744). According to some embodiments, any or all of the components 712, 714, 716, 718, 720, 730, 740, 742, 744 of the apparatus 710 may be similar in configuration and/or functionality to any similarly named and/or numbered components described herein. Fewer or more components 712, 714, 716, 718, 720, 730, 740, 742, 744 and/or various configurations of the components 712, 714, 716, 718, 720, 730, 740, 742, 744 may be included in the apparatus 710 without deviating from the scope of embodiments described herein.

In some embodiments, the transceiver device 712 may comprise any type or configuration of bi-directional electronic communication device that is or becomes known or practicable. The transceiver device 712 may, for example, comprise a Network Interface Card (NIC), a telephonic device, a cellular network device, a router, a hub, a modem, and/or a communications port or cable. In some embodiments, the transceiver device 712 may be coupled to provide data to a user device (not shown in FIG. 7), such as in the case that the apparatus 710 is utilized to effectuate a strategic, off-cycle, BRMS production environment code/table/data modification, as described herein. The transceiver device 712 may, for example, comprise a cellular telephone network transmission device that sends signals indicative of systemic resource utilization data processing interface components and/or data processing result-based commands to a user handheld, mobile, and/or telephone device. According to some embodiments, the transceiver device 712 may also or alternatively be coupled to the processing device 714. In some embodiments, the transceiver device 712 may comprise an IR, RF, Bluetooth™, and/or Wi-Fi® network device coupled to facilitate communications between the processing device 714 and another device (such as a user device and/or a third-party device; not shown in FIG. 7).

According to some embodiments, the processing device 714 may be or include any type, quantity, and/or configuration of electronic and/or computerized processor that is or becomes known. The processing device 714 may comprise, for example, an Intel® IXP 2800 network processor or an Intel® XEON™ Processor coupled with an Intel® E7501 chipset. In some embodiments, the processing device 714 may comprise multiple, cooperative, and/or inter-connected processors, microprocessors, and/or micro-engines (e.g., a computational processing device and/or server cluster). According to some embodiments, the processing device 714 (and/or the apparatus 710 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 710 comprises a server such as a blade server, necessary power may be supplied via a standard AC outlet, power strip, surge protector, a PDU, and/or Uninterruptible Power Supply (UPS) device (none of which are shown in FIG. 7).

In some embodiments, the input device 716 and/or the output device 718 are communicatively coupled to the processing device 714 (e.g., via wired and/or wireless connections and/or pathways) and they may generally comprise any types or configurations of input and output components and/or devices that are or become known, respectively. The input device 716 may comprise, for example, a keyboard that allows an operator of the apparatus 710 to interface with the apparatus 710 (e.g., by a user, such as an insurance company code migration user implementing a strategic, off-cycle, production environment modification, as described herein). The output device 718 may, according to some embodiments, comprise a display screen and/or other practicable output component and/or device. The output device 718 may, for example, provide an augmented reality interface such as the interface 720 to a user (e.g., via a website). In some embodiments, the interface 720 may comprise portions and/or components of either or both of the input device 716 and the output device 718. According to some embodiments, the input device 716 and/or the output device 718 may, for example, comprise and/or be embodied in an input/output and/or single device such as a touch-screen monitor or display (e.g., that enables both input and output via the interface 720).

In some embodiments, the apparatus 710 may comprise the cooling device 730. According to some embodiments, the cooling device 730 may be coupled (physically, thermally, and/or electrically) to the processing device 714 and/or to the memory device 740. The cooling device 730 may, for example, comprise a fan, heat sink, heat pipe, radiator, cold plate, and/or other cooling component or device or combinations thereof, configured to remove heat from portions or components of the apparatus 710.

The memory device 740 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, be segmented into and/or comprise one or more of a plurality of code migration stages, environments, and/or cells (not depicted in FIG. 7) and/or may store one or more of a transformation script 742-1, transaction instructions 742-2, batch files 742-3, production data 744-1, test data 744-2, date override data 744-3, staging data 744-4, and/or permissions data 744-5. In some embodiments, the transformation script 742-1, transaction instructions 742-2, batch files 742-3, production data 744-1, test data 744-2, date override data 744-3, staging data 744-4, and/or permissions data 744-5 may be utilized by the processing device 714 to provide output information via the output device 718 and/or the transceiver device 712.

According to some embodiments, the transformation script 742-1 may be operable to cause the processing device 714 to process production data 744-1, test data 744-2, date override data 744-3, staging data 744-4, and/or permissions data 744-5. Production data 744-1, test data 744-2, date override data 744-3, staging data 744-4, and/or permissions data 744-5 received via the input device 716 and/or the transceiver device 712 may, for example, be analyzed, sorted, filtered, decoded, decompressed, ranked, scored, plotted, and/or otherwise processed by the processing device 714 in accordance with the transformation script 742-1. In some embodiments, production data 744-1, test data 744-2, date override data 744-3, staging data 744-4, and/or permissions data 744-5 may be fed (e.g., input) by the processing device 714 through one or more mathematical and/or statistical formulas and/or models in accordance with the transformation script 742-1 to identify, transform, modify, and/or define one or more data values, elements, and/or tables to be migrated into a production environment in a strategic off-cycle manner, in accordance with embodiments described herein.

In some embodiments, the transaction instructions 742-2 may be operable to cause the processing device 714 to process production data 744-1, test data 744-2, date override data 744-3, staging data 744-4, and/or permissions data 744-5. Production data 744-1, test data 744-2, date override data 744-3, staging data 744-4, and/or permissions data 744-5 received via the input device 716 and/or the transceiver device 712 may, for example, be analyzed, sorted, filtered, decoded, decompressed, ranked, scored, plotted, and/or otherwise processed by the processing device 714 in accordance with the transaction instructions 742-2. In some embodiments, production data 744-1, test data 744-2, date override data 744-3, staging data 744-4, and/or permissions data 744-5 may be fed (e.g., input) by the processing device 714 through one or more mathematical and/or statistical formulas and/or models in accordance with the transaction instructions 742-2 to define and/or generate one or more industry-specific transactional results such as an insurance policy metric, parameter, and/or value, in accordance with embodiments described herein.

According to some embodiments, the batch files 742-3 may be operable to cause the processing device 714 to process production data 744-1, test data 744-2, date override data 744-3, staging data 744-4, and/or permissions data 744-5. Production data 744-1, test data 744-2, date override data 744-3, staging data 744-4, and/or permissions data 744-5 received via the input device 716 and/or the transceiver device 712 may, for example, be analyzed, sorted, filtered, decoded, decompressed, ranked, scored, plotted, and/or otherwise processed by the processing device 714 in accordance with the batch files 742-3. In some embodiments, production data 744-1, test data 744-2, date override data 744-3, staging data 744-4, and/or permissions data 744-5 may be fed (e.g., input) by the processing device 714 through one or more mathematical and/or statistical formulas and/or models in accordance with the batch files 742-3 to identify, define, flag, copy, and/or migrate one or more data tables and/or associated data elements and/or values, e.g., modifying a production environment in a strategic off-cycle manner, in accordance with embodiments described herein.

Any or all of the exemplary instructions 742 and data types 744 described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated). According to some embodiments, the apparatus 710 may comprise a system and/or a portion of a system that may, for example, include additional devices and/or objects, local or remote, than are depicted in FIG. 7.

The apparatus 710 may comprise, for example, a system for utilizing a staging and an e-fix environment in conjunction with a date override table to effectuate off-cycle production system modifications/maintenance, as described herein.

Referring to FIG. 8A, FIG. 8B, FIG. 8C, FIG. 8D, and FIG. 8E, perspective diagrams of exemplary data storage devices 840*a-e* according to some embodiments are shown. The data storage devices 840*a-e* may, for example, be utilized to store instructions and/or data such as the transformation script 742-1, transaction instructions 742-2, batch files 742-3, production data 744-1, test data 744-2, date override data 744-3, staging data 744-4, and/or permissions data 744-5, each of which is described in reference to FIG. 7 herein. In some embodiments, instructions stored on the data storage devices 840*a-e* may, when executed by one or more threads, cores, and/or processors (such as the processing device 714 of FIG. 7), cause the implementation of and/or facilitate the method 600 described in conjunction with FIG. 6 herein, and/or portions thereof.

According to some embodiments, a first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 846, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 846*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, a second data storage device 840*b* may comprise a CD, CD-ROM, DVD, Blu-Ray™ Disc, and/or other type of optically-encoded disk and/or other storage medium that is or becomes know or practicable. In some embodiments, a third data storage device 840*c* may comprise a USB keyfob, dongle, and/or other type of flash memory data storage device that is or becomes know or practicable. In some embodiments, a fourth data storage device 840*d* may comprise RAM of any type, quantity, and/or configuration that is or becomes practicable and/or desirable. In some embodiments, the fourth data storage device 840*d* may comprise an off-chip cache such as a Level 2 (L2) cache memory device. According to some embodiments, a fifth data storage device 840*e* may comprise an on-chip memory device such as a Level 1 (L1) cache memory device.

The data storage devices 840*a-e* may generally store program instructions, code, and/or modules that, when executed by a processing device cause a particular machine to function in accordance with one or more embodiments described herein. The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined herein and includes many exemplary protocols that are also applicable here.

VI. Terms and Rules of Interpretation

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "user device", a "remote device", or a "network device". As used herein, each of a "user device" and a "remote device" is a subset of a "network device". The "network device", for example, may generally refer to any device that can communicate via a network, while the "user device" may comprise a network device that is owned and/or operated by or otherwise associated with a particular user (and/or group of users—e.g., via shared login credentials and/or usage rights), and while a "remote device" may generally comprise a device remote from a primary device or system component and/or may comprise a wireless and/or portable network device. Examples of user, remote, and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. User, remote, and/or network devices may, in some embodiments, comprise one or more network components.

As used herein, the term "network component" may refer to a user, remote, or network device, or a component, piece, portion, or combination of user, remote, or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled, but not claimed in the present application.

What is claimed is:

1. A system for strategic maintenance of a production environment utilizing a Business Rules Management System (BRMS) topology, comprising:
   a plurality of computer servers, each computer server comprising a plurality of electronic processing devices; and
   at least one non-transitory electronic data storage device in communication with the plurality of computer servers, the at least one non-transitory electronic data storage device storing:
   (i) transactional code;
   (ii) data segmented into a plurality of code rollout staging environments, wherein the plurality of code rollout staging environments comprise at least:
      (a) a production environment,
      (b) an emergency fix environment,
      (c) a strategic maintenance staging environment, and
      (d) a plurality of standard rollout cycle staging environments, and
   (iii) instructions that when executed by the plurality of electronic processing devices of the plurality of computer servers, result in:
      executing a first batch file that identifies each of (a) an environmental date override table and (b) at least one other table that is to be edited;
      storing, in response to the execution of the first batch file and in the strategic maintenance staging environment, a copy of each of (a) the environmental date override table and (b) the at least one other table that is to be edited;
      executing a script that pulls data for the at least one other table that is to be edited from the production environment, transforms the data, and loads the transformed data into the at least one other table that is to be edited in the strategic maintenance staging environment, thereby defining a modified version of the at least one other table that is to be edited;
      setting, in the strategic maintenance staging environment, a date override value of the environmental date override table to define a test date that is different than a current date, thereby defining a modified version of the environmental date override table;
      executing the transactional code in the emergency fix environment utilizing test transaction data and the copy of the at least one other table that is to be edited, thereby defining baseline test data;
      executing a second batch file that copies, from the strategic maintenance staging environment and to the emergency fix environment, each of (a) the modified version of the environmental date override table and (b) the modified version of the at least one other table that is to be edited;
      executing the transactional code in the emergency fix environment utilizing the test transaction data and the modified copies of the environmental date override table and the at least one other table that is to be edited, thereby defining modified test data;
      computing, by comparing the baseline test data and the modified test data, that the modified copy of the at least one other table that is to be edited has performed as desired; and
      executing, in response to the computing, a third batch file that copies, from the emergency fix environment and to the production environment, the modified copy of the at least one other table that is to be edited.

2. The system of claim 1, wherein the instructions, when executed by the plurality of electronic processing devices of the plurality of computer servers, further result in:
   executing the transactional code in the production environment utilizing actual transactional data and the modified copy of the at least one other table that is to be edited, thereby defining transactional result data.

3. The system of claim 2, wherein the instructions, when executed by the plurality of electronic processing devices of the plurality of computer servers, further result in:
   issuing, utilizing the transactional result data, an insurance policy to a consumer.

4. The system of claim 1, wherein the execution of the second batch file is conducted after the execution of the transactional code in the emergency fix environment.

* * * * *